(12) United States Patent
Gandhi

(10) Patent No.: US 10,013,493 B1
(45) Date of Patent: Jul. 3, 2018

(54) CUSTOMIZED SEARCH ENGINES

(75) Inventor: Kawaljit Gandhi, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 296 days.

(21) Appl. No.: 13/549,125

(22) Filed: Jul. 13, 2012

Related U.S. Application Data

(60) Provisional application No. 61/507,380, filed on Jul. 13, 2011.

(51) Int. Cl.
G06F 17/30 (2006.01)

(52) U.S. Cl.
CPC .............. *G06F 17/30867* (2013.01)

(58) Field of Classification Search
CPC .............. G06F 17/30867; G06F 21/31
USPC .............. 707/796
See application file for complete search history.

(56) References Cited

U.S. PATENT DOCUMENTS

| | | | |
|---|---|---|---|
| 6,185,567 B1 * | 2/2001 | Ratnaraj | G06F 17/30893 |
| 6,327,628 B1 * | 12/2001 | Anuff et al. | 719/311 |
| 7,725,453 B1 * | 5/2010 | Chen | G06F 17/30864 707/711 |
| 7,987,185 B1 | 7/2011 | Mysen | |
| 8,442,994 B1 * | 5/2013 | Chen | G06F 17/30864 707/711 |
| 9,319,370 B2 * | 4/2016 | Whitmyer, Jr. | H04L 51/28 |
| 2007/0073704 A1 * | 3/2007 | Bowden et al. | 707/10 |
| 2007/0106639 A1 * | 5/2007 | Subramaniam et al. | 707/3 |
| 2009/0271374 A1 * | 10/2009 | Korn et al. | 707/3 |
| 2010/0114925 A1 * | 5/2010 | Shafer | G06F 17/30864 707/759 |
| 2011/0072010 A1 * | 3/2011 | Wu | G06F 17/30867 707/722 |
| 2011/0225139 A1 * | 9/2011 | Wang et al. | 707/709 |
| 2011/0264648 A1 * | 10/2011 | Gulik et al. | 707/722 |
| 2011/0264736 A1 * | 10/2011 | Zuckerberg et al. | 709/204 |
| 2011/0289574 A1 * | 11/2011 | Hull et al. | 726/7 |
| 2012/0036011 A1 * | 2/2012 | Schechter | G06F 21/6263 705/14.49 |
| 2012/0109940 A1 * | 5/2012 | Ishii | G06F 17/30867 707/722 |

(Continued)

FOREIGN PATENT DOCUMENTS

WO WO 2012178130 A2 * 12/2012

OTHER PUBLICATIONS

Karasawa, Kei. "Sharing private data through personalized search." Identity in the Information Society 2, No. 3 (2009): 205-220.*

(Continued)

*Primary Examiner* — Robert W Beausoliel, Jr.
*Assistant Examiner* — Jesse P Frumkin
(74) *Attorney, Agent, or Firm* — Fish & Richardson P.C.

(57) ABSTRACT

Methods, systems, and apparatus, including computer programs encoded on a computer storage medium, for receiving one or more search terms, providing the search terms as input to one or more user-specific indices, a user-specific index being generated based on an access privilege granted by a user to a data source, the data source including data that is specific to the user, generating search results based on the one or more search terms and the one or more user-specific indices, and transmitting the search results for display to a searching user.

16 Claims, 7 Drawing Sheets

(56) References Cited

U.S. PATENT DOCUMENTS

2012/0158720 A1* 6/2012 Luan et al. .................. 707/732
2014/0143227 A1* 5/2014 Yang et al. .................. 707/706
2015/0026148 A1* 1/2015 Howes et al. ............... 707/706
2016/0048886 A1* 2/2016 Nomula ............ G06F 17/30867
                                                   705/14.66

OTHER PUBLICATIONS

"Any—Definition and More from the Free Merriam-Webster Dictionary.pdf," Web page < https://www.merriamwebster.com/dictionary/any>, 2 pages, Jun. 2, 2012, retrieved from Internet Archive Wayback Machine <https://web.archive.org/web/20120602155230/https://www.merriam-webster.com/dictionary/any> on Oct. 23, 2017.*

* cited by examiner

CUSTOMIZED SEARCH ENGINES

CROSS-REFERENCE TO RELATED APPLICATIONS

This application claims priority to U.S. Application Ser. No. 61/507,380, filed on Jul. 13, 2011, the disclosure of which is expressly incorporated herein by reference in its entirety.

BACKGROUND

Users generate and distribute digital content to other users through one or more computer-implemented services. Over time, a user can generate and distribute a significant body of digital content. Digital content provided by the user might be relevant to one or more other users. However, given a large body of digital content that might be spread over several computer-implemented services, the one or more other users can encounter difficulty in discovering relevant digital content provided by the user.

SUMMARY

This specification generally relates to customized search engines, and more particularly to user-specific customized search engines.

In general, innovative aspects of the subject matter described in this disclosure may be embodied in methods that include the actions of receiving one or more search terms, providing the search terms as input to one or more user-specific indices, a user-specific index being generated based on an access privilege granted by a user to a data source, the data source including data that is specific to the user, generating search results based on the one or more search terms and the one or more user-specific indices, and transmitting the search results for display to a searching user.

These and other implementations may each optionally include one or more of the following features. For instance, actions further include: receiving user input, the user input being provided by the user and identifying one or more data sources, for each of the one or more data sources: generating a search index, the search index being directed to data that is specific to the user, and storing the search index in computer-readable memory, the search index being an index of the one or more user-specific indices; actions further include receiving user credentials, the user credentials enabling access to the data that is specific to the user and that is provided as the data source; actions further include: generating computer program code, the computer program code comprising instructions that, when executed by one or more processing apparatus, cause a customized search box to be displayed, and transmitting the computer program code for display to the user; the data source is a data source of a service provider; the service provider is a provider of one or more computer-implemented services, the one or more computer-implemented services including one or more of an email service, an e-commerce service, a social networking service and a blog hosting service; the user is a user of a computer-implemented service provided by the service provider and the data includes data that is generated by the user through use of the computer-implemented service; actions further include: determining that a search result of the search results is associated with an access control list (ACL), and determining that the searching user is identified in the ACL, wherein the search result is transmitted to the searching user in response to determining that the searching user is identified in the ACL; actions further include: determining that a search result of the search results is associated with an access control list (ACL), determining that the searching user is not identified in the ACL, and in response to determining that the searching user is not identified in the ACL, generating a generic search result that corresponds to the search result and that maintains a confidentiality of the search result, wherein the search results include the generic search result; the data that is specific to the user includes data that has been authorized by the user for further use; further use includes re-distribution of the data by another user; the user-specific index is provided as a portion of a general index; and the user-specific index is integrated into a general index.

In general, innovative aspects of the subject matter described in this disclosure may be also be embodied in methods that include the actions of receiving user input identifying one or more data sources, the data sources including data that is specific to a user providing the user input, and, for each of the one or more data sources: receiving user input comprising authentication data for accessing the data source, generating a search index, the search index being directed to user-specific data provided in the data source, and storing the search index in computer-readable memory, the search index being an index of one or more user-specific indices.

Other implementations of this aspect include corresponding systems, apparatus, and computer programs, configured to perform the actions of the methods, encoded on computer storage devices.

Particular implementations of the subject matter described in this specification may be used to realize one or more of the following, example advantages. In some aspects, implementations of the present disclosure enables users to generate user-specific search engines that can be efficiently and effectively be used by other users to search for relevant content that has been generated by the user. In some aspects, digital content generated by a user, and that can be relevant to the user at the time of generation, can be subsequently exposed or otherwise discovered when it can be relevant to another user.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Implementations of the present disclosure are generally directed to generating customized search engines (CSEs). In particular, and in accordance with implementations of the present disclosure, a user is able to generate a user-specific CSE by registering links to digital content that the user has distributed and/or services that the users uses via the Internet. In some implementations, the user can provide further customizations including an appearance of a search interface (hereinafter referred to as a search box), ranking of search results, as well as other refinements and customizations. Computer program code (e.g., JavaScript) corresponding to a customized search box is provided to the user, which the user can embed in various locations (e.g., in one or more web pages). For example, the user can embed the computer program code into a web page corresponding to a blog authored by the user, such that the customized search box is displayed within the web page and readers of the user's blog can search user-specific content by inputting search queries into the customized search box.

Figure 1:
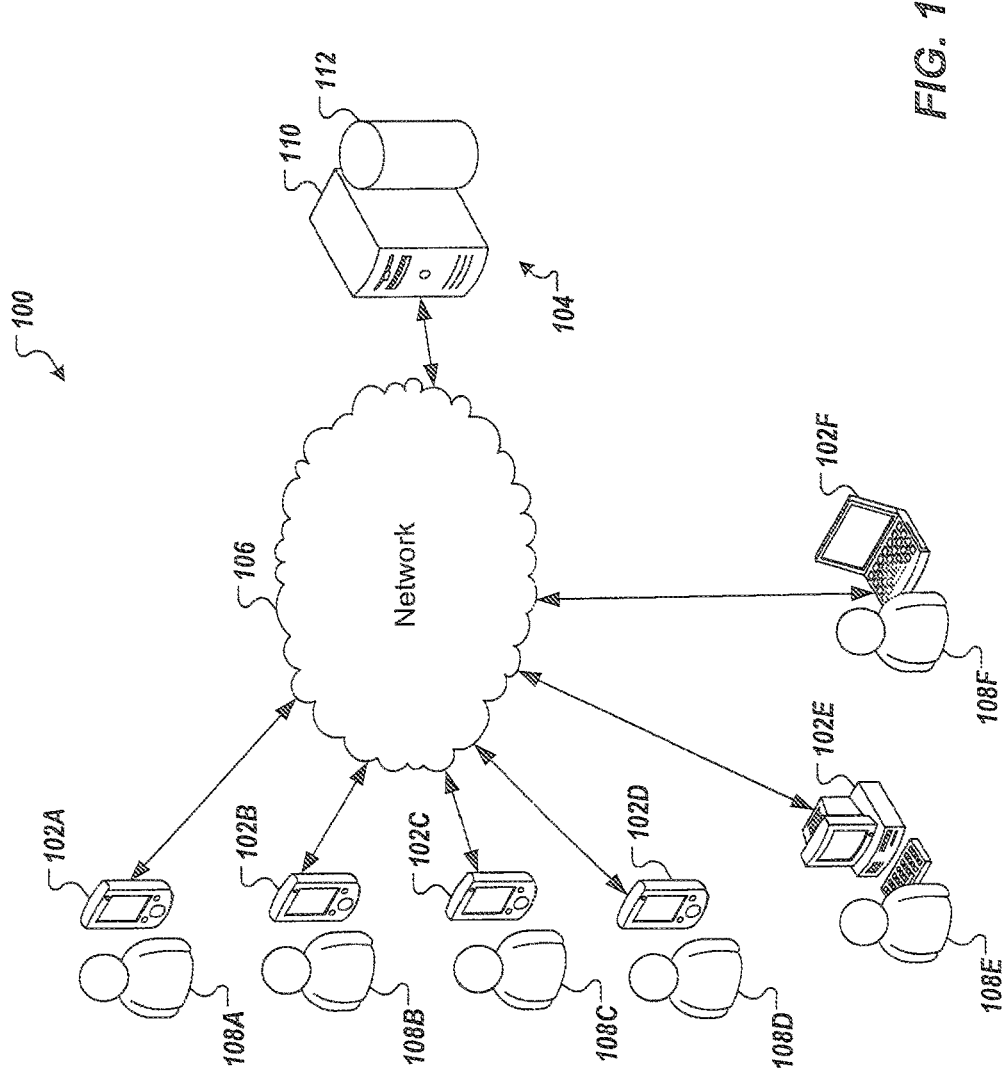
FIG. 1 depicts an example system that can execute implementations of the present disclosure.

FIG. 1 is a diagram of an example network architecture 100. The network architecture 100 includes a number of client devices 102A, 102B, 102C, 102D, 102E, 102F (collectively references as client devices 102A-102F) communicably connected to a server system 104 by a network 106. Users 108A, 108B, 108C, 108D, 108E, 108F (collectively references as users 108A-108F) can interact with client devices 102A-102F, respectively. The server system 104 includes one or more processing devices 110 and one or more data stores 112. The processing devices 110 executes computer instructions (e.g., program code) stored in the data store 112 to perform functions as discussed herein.

Users 108A-108F of the client devices 102A-102F access the server system 104 to use services provided by one or more service providers. For example, the client devices 102A-102F can execute web browser applications that can be used to access computer-implemented services. In another example, the client devices 102A-102F can execute software applications that are specific to the services. In some examples, services can include Internet search services, email services, instant messaging (IM) services, contact management services and social networking services. In some examples, one or more service providers can provide the services. In some examples, each user can establish an account with respective service providers. A user can log into the account (e.g., using an associated username and password) to access the service. For example, a user can log into a website or an application corresponding to an email service to send and receive email.

In some implementations, the client devices 102A-102F can be computing devices such as laptop or desktop computers, smartphones, personal digital assistants, portable media players, tablet computers, or other appropriate computing devices. In some implementations, the server system 104 can be a single computing device such as a computer server. In some implementations, the server system 104 can represent a plurality of computing devices working together to perform the actions of a server computer (e.g., cloud computing). In some implementations, the network 106 can be a public communication network (e.g., the Internet, cellular data network, dialup modems over a telephone network) or a private communications network (e.g., private LAN, leased lines).

Implementations of the present disclosure enable a user to generate a user-specific CSE. In some examples, the user identifies one or more data sources for the user-specific CSE to crawl and the user-specific CSE generates a search index for each of the one or more data sources. The data sources generally include user-specific data sources. In some examples, a data source can include a social networking service that the user interacts with to distribute digital content (e.g., posts, images, videos) to contacts (e.g., friends, family, co-workers) over the Internet. User data associated with the social networking service can be stored in computer-readable memory on one or more servers operated by a social network service provider. In some examples, a data source can include a blog that is authored by the user. For example, the user can post digital content (e.g., commentary, links, images, videos) to one or more blog web pages. In some examples, the blog web pages can be hosted by a blog service provider and the digital content posted by the user can be stored in computer-readable memory on one or more servers operated by the blog service provider.

In some examples, a data source can include a sharing service that can be operated by a sharing service provider. Example sharing services can include a video sharing service, a photo sharing service, and a ratings and review sharing service. For example, the user can post videos to the video sharing service and images to the image sharing service, as well as textual comments (e.g., captions) regarding the videos and/or images, which can be viewed on web pages of the respective sharing services. As another example, the user can post ratings and reviews of ratable entities (e.g., restaurants, theaters, businesses, etc.) to a rating and review sharing service, which can be viewed on web pages of the rating and review sharing service. In some examples, a data source can include an e-commerce service that can be operated by an e-commerce service provider. Example e-commerce services can include a shopping service and a rental service. For example, the user can shop for goods using a website provided by an e-commerce service provider, which goods can be ordered by the user through the website and can be delivered to the user. As another example, the user can rent goods (e.g., DVDs) using a website provided by an e-commerce service provider, which goods can delivered to the user and returned to the e-commerce service provider after use. In some examples, the user can also post ratings and reviews of goods and/or services to the e-commerce websites.

Although example data sources are discussed herein, it is appreciated that implementations of the present disclosure are not limited to these example data sources.

In general, the user establishes a user profile with each service provider. Continuing with the example services above, the user establishes a respective user profile with each of the social networking service, the blog service, the sharing service and the e-commerce service. In some examples, the user profile includes a username and password. The user logs into a service using the respective username and password. In some implementations, the user can log into a service through a website of the service provider. In some implementations, the user can log into a service through a service-specific application executed on a computing device (e.g., a mobile application executed on a smartphone).

For example, the user can log into the social networking service using a respective username and password. Once logged in, the user is able to distribute digital content using the social networking service and/or review digital content that has been distributed to the user. As another example, the user can log into the blog service using a respective username and password. Once logged in, the user is able to distribute digital content using the blog service. As another example, the user can log into the sharing service using a respective username and password. Once logged in, the user is able to post digital content to the sharing service. As another example, the user can log into the rating and review service using a respective username and password. Once logged in, the user is able to post ratings and reviews of ratable entities to the rating and review service. As still another example, the user can log into the e-commerce service using a respective username and password. Once logged in, the user is able to purchase and/or rent goods and/or services and can post ratings and reviews of the goods and/or services to the e-commerce service.

User interaction with each of the service providers generates digital content that can be stored in one or more data stores associated with the respective service providers. In this manner, data stores associated with each of the services are data sources of user-specific data. Digital content generated and distributed by the user may be relevant at the time of distribution. For example, a first user can generate a post that is distributed through the social networking service regarding a trip that the user is currently on (e.g., "Skiing in Tahoe is great, but the powder at Squaw makes it the place to be!"). The post can be relevant to the user at the time, by informing contacts within the social networking service that the user is skiing in Lake Tahoe and prefers the Squaw Valley ski resort. The digital content, however, can also be relevant at other times and to other users. For example, a second user can be a friend of the first user and can be planning a ski trip to Lake Tahoe. The second user can be curious as to which ski resorts are preferable and why. The second user can search general digital content provided on the Internet, for example, but the mass of available content and the anonymity of the sources of the digital content might not be helpful to the second user.

The user-specific CSEs of the present disclosure provide a mechanism for users to enable other users to search user-specific digital content that has been generated and distributed. In this manner, digital content that was relevant to an authoring user at the time of distribution, may be surfaced as relevant to another user at some point after the original distribution of the digital content. Continuing with the example above, the second user can execute a search using a user-specific CSE that is specific to the first user based on the example search term "Lake Tahoe." In response, the user-specific CSE returns search results that can include, among others, the first user's post that "Skiing in Tahoe is great, but the powder at Squaw makes it the place to be!" In this manner, the second user's curiosity as to which ski resorts are preferable and why can be satisfied based on data generated by a friend (i.e., the first user).

Referring again to FIG. 1, the user 108A can establish a user-specific CSE to enable the other users 108B-108F to search digital content generated and distributed by the user 108A. The user-specific CSE can be generated using a CSE service provided by a CSE service provider and can be hosted by the CSE service provider. For example, the CSE service provider can operate a server system (e.g., the server system 104) to generate and host the user-specific CSE. In some examples, and as discussed in further detail below, the CSE provider can provide a CSE wizard to step the user 108A through creation of the user-specific CSE to generate corresponding computer program code. In some examples, the user 108A can provide user-generated computer-program code to the CSE service provider.

The user-specific CSE is established based on one or more services identified by the user 108A. The one or more services can include the example services specifically discussed herein and/or any other appropriate service. In some implementations, the user 108A provides appropriate credentials to enable the user-specific CSE to access data sources corresponding to each of the services. In some implementations, the user-specific CSE generates a CSE profile for each of the services and accesses data and/or digital content specific to the user 108A using the CSE profile. Each CSE profile can include the user-provided credentials that are specific to the respective service. The user-specific CSE crawls the user-specific data and/or digital content at each service and generates a corresponding search index.

The user 108A publishes a customized search box. In some examples, the customized search box can be published in a user profile that is specific to the user 108A. In some examples, the customized search box can be published in one or more web pages managed by the user 108A. In some implementations, the customized search box is only accessible to users that have been granted access to a user profile web page of the user 108A, and/or that have been granted access to the one or more web pages managed by the user 108A. In some implementations, the user 108A can enable the customized search box to be publicly available to any users of the Internet.

With continued reference to FIG. 1, the users 108B-108F can access the user-specific CSE published by the user 108A. For purposes of illustration, the user 108B will be considered. With reference to the user 108B, the user 108B can access the customized search box using the client device 102B. For example, the client device can execute an application (e.g., a web browser application) to access a web page, in which the customized search box is provided (e.g., the user 108B requests the web page and, in response to the request, the server system 104 serves a web page document to the client device 102B to render the web page including the customized search box in the web browser). The user 108B can input search terms into the customized search box, which search terms can be submitted to the user-specific CSE that is executed on the backend (e.g., on the server system 104). The user-specific CSE can cross-reference the search terms with the service-specific indices to identify digital content that is relevant to the search terms. Search results can be generated and can be displayed to the user 102B.

In some implementations, the search results can include digital content that has been made publicly available by the user 102A. For example, the user 102A posted a rating and review of a ratable entity (e.g., using the example rating and review service discussed above) and indicated that the rating and review are to be publicly available (i.e., available to any users of the Internet). Because the particular rating and review is publicly available, the rating and review is provided in the search results. In some implementations, the search results can include digital content that has been access-limited by the user 102A. For example, the user 102A posted an image to the social networking service and specified an audience that has access to the image. For example, an access control list (ACL) can be generated based on the specified audience and can be associated with the image. Only those users that are identified in the ACL are granted access to the image. In some examples, when a user enters a search term into a search box corresponding to a user-specific CSE, user profile information can be determined, if the user is logged in. The user profile information can be compared to information provided in the ACL corresponding to the digital content. In some examples, the user 102B is identified in the ACL. Consequently, the image (e.g., the image itself and/or a link to the image) is provided in the search results. In some examples, the user 102B is not identified in the ACL. Consequently, the image (e.g., the image itself and/or a link to the image) is not specifically provided in the search results. Instead, and in some implementations, a generic representation of a relevant search result and an access request link can be provided. The user 102B can activate (e.g., click on) the access request link to request access to the digital content. The user 102A can receive a notification regarding the request and can grant or deny access to the digital content.

In some examples, the user can specify whether particular digital content is authorized by the user to be reshared by other users. For example, the user can generate a post that is distributed through a social networking service. The user can indicate that the post is not to be reshared (e.g., forwarded, or otherwise re-posted) by other users. Consequently, and in some implementations, although the post may be relevant to search terms provided to a user-specific search engine, the post will not be provided in the search results.

In some examples, whether the searching user is identified in an ACL can be determined based on a user profile of the searching user. Continuing with the example above, the user 102B can have a user profile established with the service provider hosting the user-specific CSE and/or user profiles established with service providers that store the digital content generated by the user 102A. Identification data associated with the user profiles (e.g., usernames established by the searching user) can be compared to corresponding data provided in the ACL associated with the particular digital content. If the identification data matches the corresponding data provided in the ACL, the digital content is provided in the search results. If the identification data does not match, the corresponding data provided in the ACL, the digital content is not provided in the search results. Instead, and in some implementations, a generic representation of a relevant search result and an access request link can be provided.

Figure 2A:
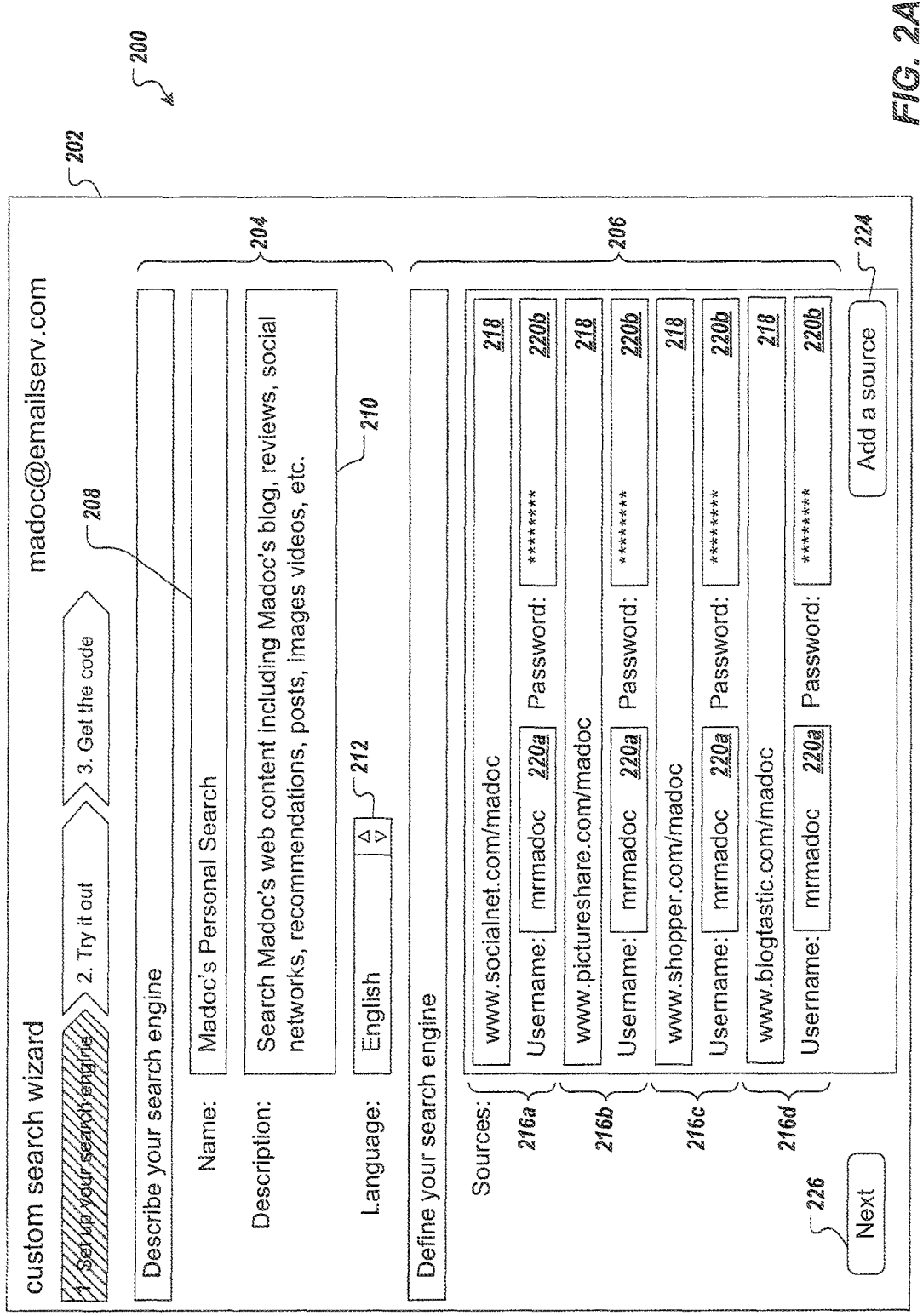
FIGS. 2A-2C depict example screen-shots of an example graphical user interface for generating a customized search engine.
Figure 2B:
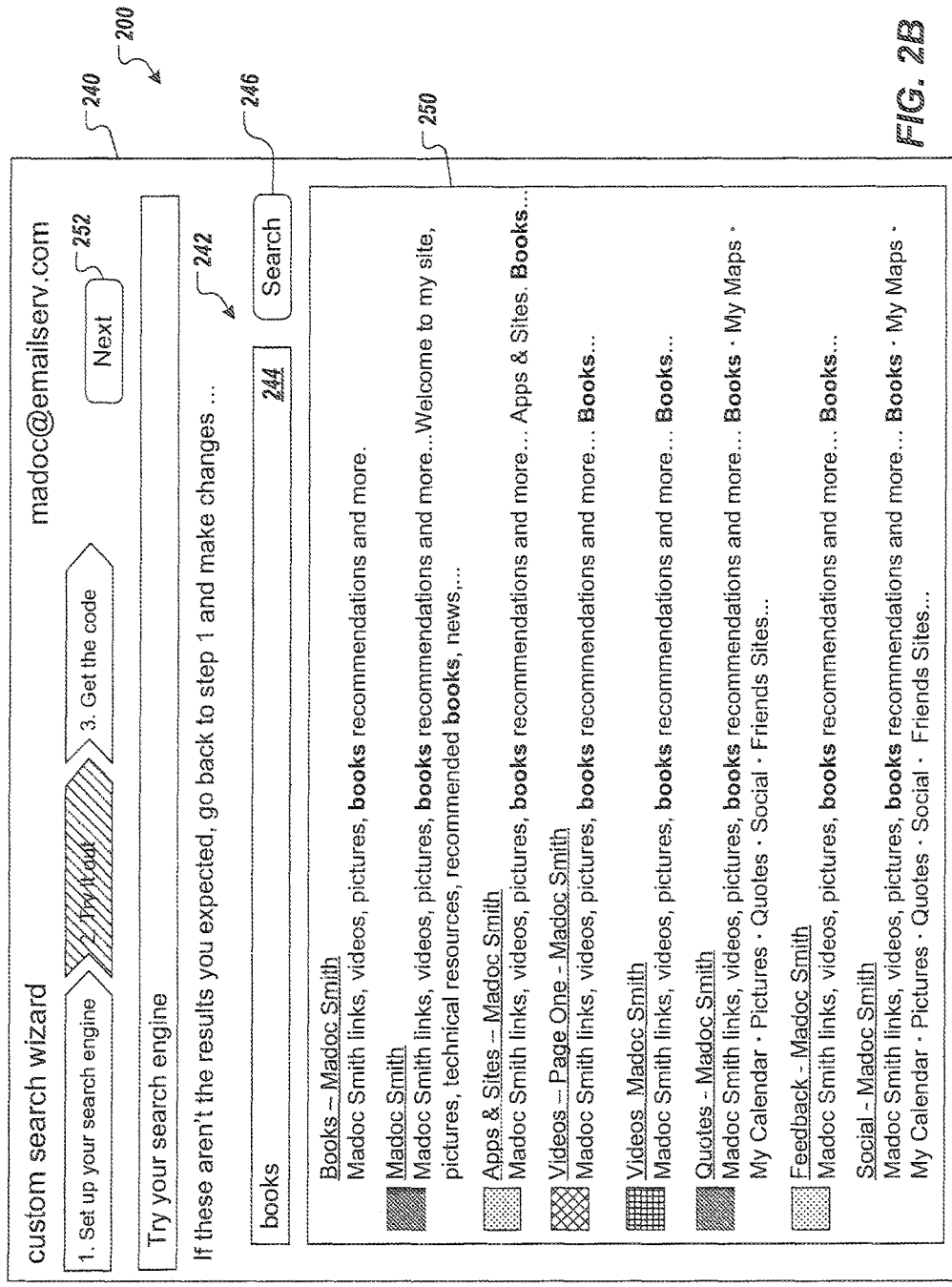
Figure 2C:
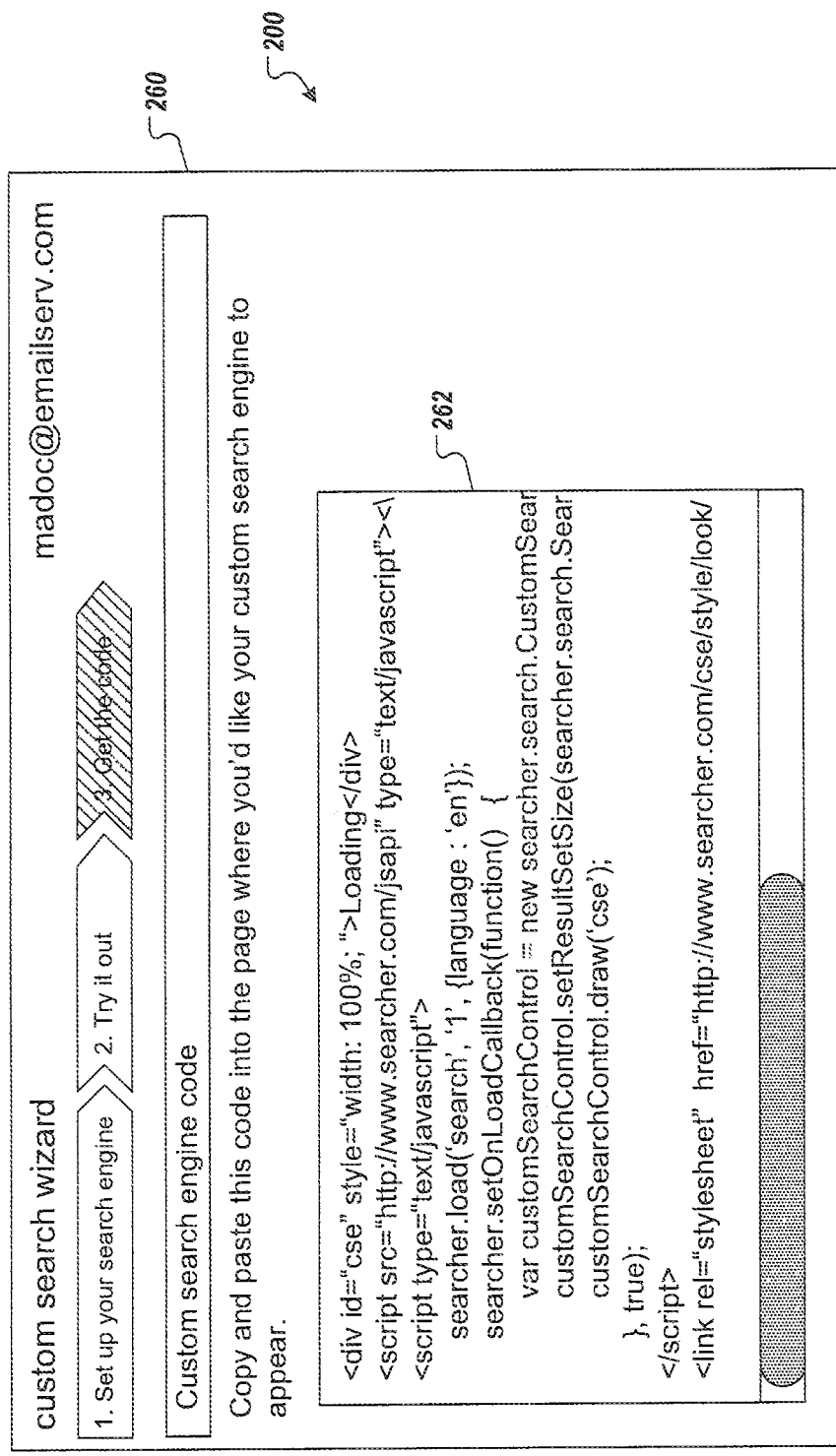

FIG. 2A-2C depict example screen-shots of an example graphical user interface 200 for generating a customized search engine. The example graphical user interface 200 can be provided by a service provider that provides a user-specific CSE service. The service provider can provide other services, as discussed in further detail herein. The graphical user interface 200 corresponds to an example implementation, in which a CSE wizard is used to guide a user through creation of a user-specific CSE. In the depicted example, a user "Madoc" is logged into the CSE service using credentials corresponding to the user's profile established with the CSE service (e.g., the user's username is provided as an email address "madoc@emailserv.com").

In the depicted example, the CSE wizard provides a first interface 202 corresponding to setting up a user-specific CSE. The first interface 202 includes a search engine description section 204 and a search engine definition section 206. The search engine description section 204 includes a name interface 208, a description interface 210 and a language selection interface 212. The user can provide input to the name interface 208 to name the to be generated user-specific CSE (e.g., "Madoc's Personal Search"). This is the name that can be presented to a searcher using the user-specific CSE. The user can provide input to the description interface 210 generally describing the content that is searchable using the user-specific CSE. In the depicted example, the description includes a general inventory of digital content. In some examples, the user-specific CSE can be directed to a specific area. The user can provide input to the language interface 212 to select a language in which the user-specific CSE operates.

The search engine definition section 206 includes a source interface 214 for identifying data sources that are to be searched using the user-specific CSE. In the depicted example, the source interface 214 includes a number of sub-interfaces 216a, 216b, 216c, 216d, each of which corresponds to a data source. Each sub-interface 216a-216d includes an identifier interface 218 and credential interfaces 220a, 220b. The user can provide input to the identifier interface 218 to identify the data source and can provide input to the credential interfaces 220a, 220b to provide credential data that might be necessary to access the identified data source.

In the depicted example, the sub-interface 216a is directed to a social networking service that is used by the user to distribute digital content. The identifier interface 218 of the sub-interface 216a identifies the example social networking service using a uniform resource locator (URL) (e.g., www.socialnet.com/madoc) that points to the user's profile within the example social networking service. The credential interfaces 220a, 220b respectively include the username and password that can be used to access digital content provided by the user to the social networking service. In the depicted example, the sub-interface 216b is directed to a sharing service that is used by the user to share photos (i.e., digital images). The identifier interface 218 of the sub-interface 216b identifies the example sharing service using a URL (e.g., www.pictureshare.com/madoc) that points to the user's profile within the sharing service. The credential interfaces 220a, 220b respectively include the username and password that can be used to access digital content provided by the user to the sharing service.

In the depicted example, the sub-interface 216c is directed to an e-commerce service that is used by the user. The identifier interface 218 of the sub-interface 216c identifies the example e-commerce service using a URL (e.g., www.shopper.com/madoc) that points to the user's profile within the example e-commerce service. The credential interfaces 220a, 220b respectively include the username and password that can be used to access data provided by the user to the e-commerce service. In the depicted example, the sub-interface 216d is directed to a blogging service that is used by the user to blog. The identifier interface 218 of the sub-interface 216b identifies the example blogging service using a URL (e.g., www.blogtastic.com/madoc) that points to the user's profile within the blogging service. The credential interfaces 220a, 220b respectively include the username and password that can be used to access digital content provided by the user to the blogging service.

In some implementations, one or more services can be provided by the service provider that also provides the CSE service. For example, the CSE service provider can also be an email service provider, a sharing service provider, a blogging service provider, an e-commerce service provider and/or a social networking service provider. Accordingly, and in some implementations, a sub-interface might not include credential interfaces. For example, if the user identifies a service in an identifier interface 218, which service is a service that is also provided by the CSE service provider, additional credential data is not required. Instead, for example, the credentials already provided by the user when logging into the CSE service can be used to access digital content from the identified service.

The source interface 214 can include a button 224 to add further sources to the interface 214. In some examples, the user can activate (e.g., click on) the button 224 and the source interface 214 can expand to include an additional sub-interface.

The first interface 202 can include a button 226 that can be activated (e.g., clicked on) by the user to initiate generation of the user-specific CSE based on the sources identified in the source interface 214. In some examples, activation of the button 226 initiates a data source crawling process, during which the CSE service accesses the data sources identified in the source interface 214, crawls the user-specific data provided at each of the data sources and generates source-specific indices, each source specific index corresponding to a data source identified in the source interface 214. The source-specific indices are stored in computer-readable memory. Each source-specific index can include a list of keywords and a URL identifying where each keyword is found in one or more user-specific sources. In some examples, each source specific index can include an ACL corresponding to a URL, which ACL defines the accessibility of the URL and the digital content it points to, as discussed above. In some examples, each source-specific index can include the number of times each keyword appears and the locations at which each keyword appears within one or more user-specific sources, as well as weighting information that can be used to rank search results. In some examples, ranking information can be provided (e.g., from the user) to rank search results generated based on the source-specific index.

Referring now to FIG. 2B, activation of the button 226 also progresses the CSE wizard to a second interface 240 corresponding to testing the user-specific search engine. The second interface 240 can include a test search interface 242 that includes a query interface 244 and a search button 246. The user can input one or more test search terms into the query interface 244 (e.g., "books" in the depicted example) and can activate (e.g., click on) the search button 246 to initiate a search of the user-specific sources based on the test search term. The user-specific CSE can review the source-specific indices in view of the test search term to generate search results. Example search results 250 are provided in the second interface 240. The user can review the example search results 250 and determine whether the search results are sufficient, or satisfactory to the user (e.g., in view of the user's intentions for the user-specific CSE). If the user is dissatisfied with the search results, the user can return to the first interface 202 to modify the data sources that underlie the user-specific CSE.

The second interface 240 can include a button 252 that can be activated (e.g., clicked on) by the user to initiate generation of the computer program code that can be used to embed a customized search box corresponding to the user-specific CSE. In some examples, activation of the button 252 initiates generation of the computer program code and progresses the CSE wizard to a third interface 260 for presentation of the computer program code to the user. The computer program code can be generated based on the name of search engine given and a unique ID can be assigned to the customized search box. In the depicted example, the third interface 260 includes a code box 262 within which computer program code (e.g., JavaScript) is presented to the user. The user can select the computer program code (e.g., using a pointing device) and can copy the computer program code. The user can paste the computer program code into a document (e.g., a web page document) to enable the customized search box corresponding to be displayed to other users. For example, the computer program code can be embedded within a web page document, such that the customized search box is rendered within a corresponding web page.

In some implementations, the user can generate a plurality of user-specific CSEs, where each user-specific CSE is defined based on a set of services. For example, the user can define a first user-specific CSE based on a first set of services and a second user-specific CSE based on a second set of services. The first set of services can be different than the second set of services. In some examples, a service can be in the first set of services and can also be in the second set of services. In this manner, the user can define user-specific CSEs that are tailored to particular.

The customized search box can be made available to other users to enable the other users to search digital content that is associated with the user that created the user-specific CSE. For example, the customized search box can be rendered in a web page authored by the user, as discussed above. In some examples, the customized search box can be provided in a user profile page provided within the context of the CES service provider.

In some implementations, users that create user-specific CSEs can indicate one or more other users that are to have access to the respective user-specific CSEs. In some examples, user access can be defined using the CSE wizard, discussed above. For example, the CSE wizard can include an access interface, to which the user creating the user-specific CSE provides input defining other users that have access to the user-specific CSE (e.g., identifying other users based on email addresses and/or usernames associated with the CSE service provider). In some implementations, an ACL corresponding to the user-specific CSE can be generated and can identify the one or more other users that have been granted access to the user-specific CSE.

In some implementations, and as discussed by way of example below, the grant of access to a user-specific CSE can be a non-exclusive access. For example, a user that creates a user-specific CSE can make the user-specific CSE publicly available (e.g., by embedding the user-specific CSE in a publicly available web page). Concurrently, the user can indicate one or more other users that are to have access to the user-specific CSE, which one or more other users can access the user-specific search service through the CSE service provider. In some implementations, the CSE service provider can provide a general search box, into which users can input search terms. If a searching user has been granted access to the user-specific CSE, search terms entered by the user using the general search box can be provided to the user-specific CSE, such that the search results include search results from user-specific data sources.

For purposes of illustration, and referring again to FIG. 1, the user 108A can create a first user-specific CSE, the user 108B can create a second user-specific CSE and the user 108E can create a third user-specific CSE. The user 108A can indicate that the users 108B, 108D, 108E are to have access to the first user-specific CSE, and can make the first user-specific CSE publicly available (e.g., by embedding a customized search box corresponding to the first user-specific CSE in a publicly available web page). The user 108B can indicate that the users 108A, 108C, 108D, 108F are to have access to the second user-specific CSE, and otherwise not make the second user-specific CSE available to other users. The user 108E can indicate that the users 108A, 108B, 108C, 108D, 108F are to have access to the third user-specific CSE, and can make the third user-specific CSE publicly available (e.g., by embedding a customized search box corresponding to the third user-specific CSE in a publicly available web page).

Continuing with the example above, the user 108D accesses a search service provided by the CSE provider. A general search box can be displayed to the user 108D, into which the user 108D can enter search terms. In some implementations, the general search box can be directed to searches based on user-specific CSEs that the user 108D has been granted access to. The user 108D can enter search terms into the general search box. A search can be executed based on the search terms. The search can be executed using the first user-specific CSE, the second user-specific CSE and the third user-specific CSE, because the user 108D has been granted access to each. Consequently, search results generated based on the search terms can include search results that are specific to each of the user 108A, the user 108B and the user 108E.

In some implementations, the general search box can be directed to searches based on user-specific CSEs that the user 108D has been granted access to, as well as a search provider search engine. The user 108D can enter search terms into the general search box. A search can be executed based on the search terms. The search can be executed using a general search engine provided by the search service provider, the first user-specific CSE, the second user-specific CSE and the third user-specific CSE, because the user 108D has been granted access to each. Consequently, search results generated based on the search terms can include general search results and search results that are specific to each of the user 108A, the user 108B and the user 108E. For example, the general search results can include search results that can be generated based on non-user specific data that is publicly available on the Internet.

In accordance with the example above, search results that are presented to a searching user can include search results that are generated using separate search engines. The search results can be combined and can be concurrently displayed to the searching user. In some examples, search results can be presented in clusters based on the search engine used to generate the search results. For example, a first cluster can include search results provided by a first user-specific CSE, a second cluster can include search results provided by a second user-specific CSE, a third cluster can include search results provided by a third user-specific CSE, and a fourth cluster can include search results provided by a general search engine.

Continuing with the example above, the user 108F accesses the search service provided by the CSE provider. The general search box can be displayed to the user 108F, into which the user 108F can enter search terms. In some implementations, the general search box can be directed to searches based on user-specific CSEs that the user 108F has been granted access to. The user 108F can enter search terms into the general search box. A search can be executed based on the search terms. The search can be executed using the second user-specific CSE and the third user-specific CSE, because the user 108F has been granted access to the second user-specific CSE and the second user-specific CSE (but not to the first user-specific CSE). Consequently, search results generated based on the search terms can include search results that are specific to the user 108B and the user 108E.

However, and as noted above, the user 108A has made the first user-specific CSE publicly available. Consequently, the user 108F can visit a web page that includes a customized search box corresponding to the first user-specific CSE. The user 108F can enter search terms into the customized search box and a search can be executed based on the search terms. The search can be executed using the first user-specific CSE. Consequently, search results generated based on the search terms can include search results that are specific to the user 108A.

In some examples, the search terms can be provided as input to the indices and, if a search term matches a keyword entry in an index, a search result can be generated including a URL of where that keyword is found in the user-specific data sources (e.g., a post to a social networking service). In some examples, ranking data can be provided for ranking search results generated using the user-specific CSE. In some examples, the ranking data can include ranking data provided by the user that created the user-specific CSE. In some examples, the search results can be generated based on other data. Example other data can include a geo-location corresponding to a location from where the user entered the search term (e.g., the searching user is sitting in California as opposed to Germany), relevance of information (e.g., data to determine whether particular content is relevant to the searching user), a type of device that the searching user has input the search terms through, a degree of separation between the searching user and user owner of the user-specific CSE, a freshness of the user content (e.g., something shared months ago can be less relevant than something shared more recently, or vice-versa, based on the search terms), and/or a filter or groups of filters (e.g., filter based on topic, contacts, etc.).

In some examples, one or more search results of the displayed search results can be associated with one or more actions. Example actions can include an email action, a hyperlink action, a chat action and a re-post action. For example, a search result can be displayed in a list of search results and can include a post that the user (i.e., the user that defined the user-specific CSE) posted in a social networking service. The search result can include a re-post icon that can be activated (e.g., clicked on) by the searching user to initiate a re-post action. The re-post action can cause the post provided in the search result to be posted to a social networking service of the searching user. As another example, a search result can be displayed in a list of search results and can include an email icon that can be activated (e.g., clicked on) by the searching user to initiate an email to the user. As another example, a search result can be displayed in a list of search results and can include a chat icon that can be activated (e.g., clicked on) by the searching user to initiate an instant messaging, or chat session with the user.

Figure 3:
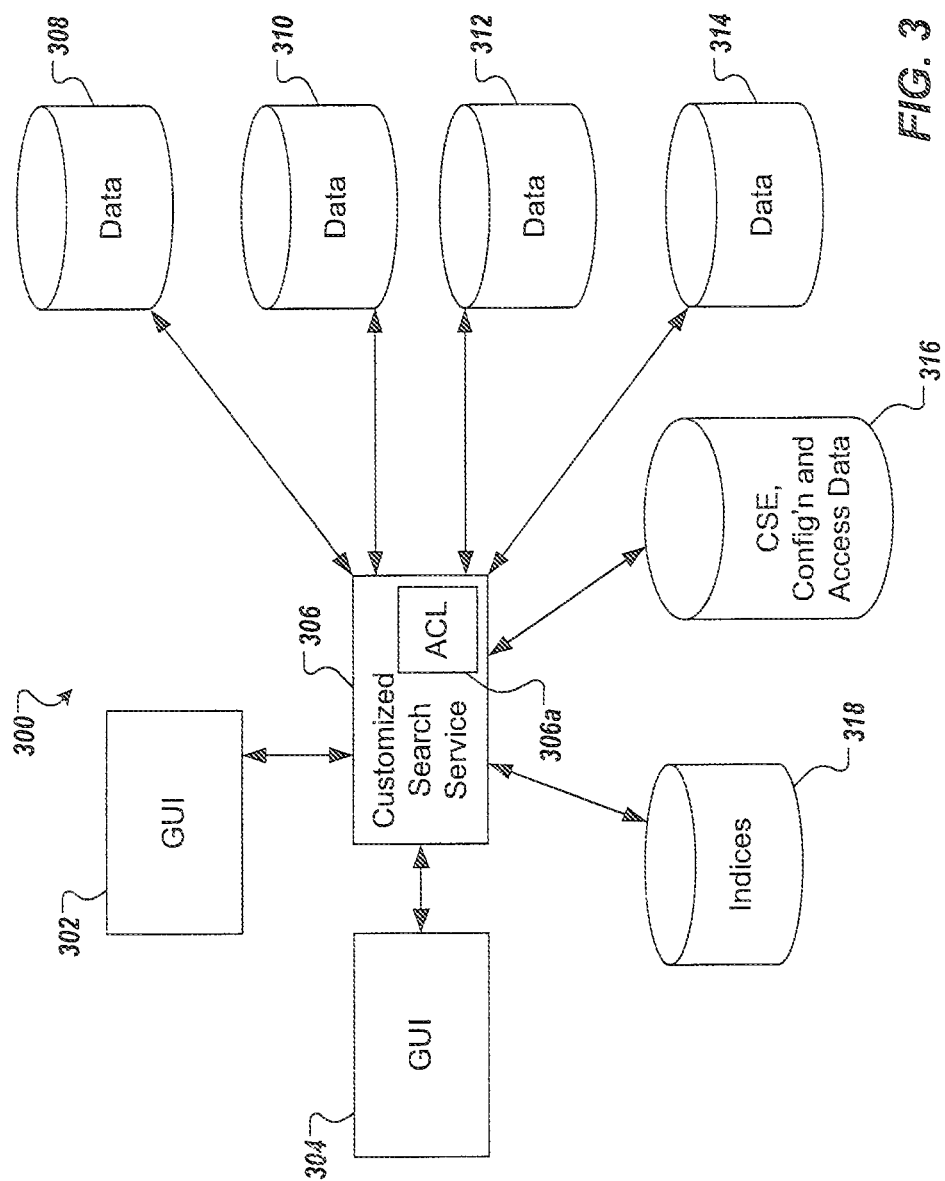
FIG. 3 depicts example components that can be used to realize implementations of the present disclosure.

FIG. 3 depicts example components 300 that can be used to realize implementations of the present disclosure. In the depicted example, the components 300 include a first graphical user interface (GUI) 302, a second GUI 304, a customized search service component 306, an ACL component 306a, a first data source 308, a second data source 310, a third data source 312, a fourth data source 314, a CSE data store 316 and an indices data store 318. In some implementations, the GUI 302 can be provided using one or more computer program applications executed using one or more computing devices (e.g., a web browser application executed on a client device). In some implementations, the GUI 304 can be provided using one or more computer program applications executed using one or more computing devices (e.g., a web browser application executed on a client device). In some implementations, the customized search service component 306 and the ACL component 306a can each be provided using one or more computer program applications executed using a computing device (e.g., application(s) executed on a server system). In some examples, the customized search service component 306 and the ACL component 306a can be hosted by a CSE service provider. In the depicted example, the ACL component 306a can be provided as a sub-component of the customized search service component 306.

In some implementations, the first data source 308 can be provided as a database stored in computer-readable memory.

The first data source 308 can be maintained by a service provider (e.g., the CSE service provider, or another, separate service provider). In some implementations, the second data source 310 can be provided as a database stored in computer-readable memory. The second data source 310 can be maintained by a service provider (e.g., the CSE service provider, or another, separate service provider). In some implementations, the third data source 312 can be provided as a database stored in computer-readable memory. The third data source 312 can be maintained by a service provider (e.g., the CSE service provider, or another, separate service provider). In some implementations, the fourth data source 314 can be provided as a database stored in computer-readable memory. The fourth data source 314 can be maintained by a service provider (e.g., the CSE service provider, or another, separate service provider). For purposes of illustration, the first data source 308 can be maintained by a social networking service provider (e.g., www.socialnet.com of FIG. 2A), the second data source 310 can be maintained by a sharing service provider (e.g., www.pictureshare.com of FIG. 2A), the third data source 312 can be maintained by an e-commerce service provider (e.g., www.shopper.com of FIG. 2A), and the fourth data source 314 can be maintained by a blog service provider (e.g., www.blogtastic.com of FIG. 2A).

In some implementations, the CSE data store 316 can be provided as a database stored in computer-readable memory. The CSE data store 316 can be maintained by a service provider (e.g., the CSE service provider). In some implementations, the indices data store 318 can be provided as a database stored in computer-readable memory. The indices data store 318 can be maintained by a service provider (e.g., the CSE service provider).

A user can access the CSE service using the GUI 302. For example, the GUI 302 can communicate with the customized search service component 306 via a network (e.g., the Internet). In some implementations, a CSE wizard can be displayed to the user through the GUI 302. The user can provide input to the CSE wizard to define a user-specific CSE, as discussed above with reference to FIGS. 2A-2C. The user input can identify the data sources 308-314 as data sources, from which user-specific search results are to be generated. The customized search service component 306 can generate the user-specific CSE and can generate computer program code (e.g., JavaScript) corresponding thereto. The customized search service component 306 can store the user-specific CSE in the CSE data store 316. In some examples, the CSE data store 316 can store configuration data (e.g., filters) and access data (e.g., data indicating to one or more users that have access to the user-specific CSE). The customized search service component 306 can access each of the data sources 308-314 (e.g., based on credentials provided by the user) to generate a plurality of source-specific indices, as discussed in detail above. The source-specific indices can be stored in the indices data store 318.

A searching user can access the CSE service using the GUI 304. For example, the GUI 304 can communicate with the customized search service component 306 via a network (e.g., the Internet). In some implementations, a customized search box corresponding to a user-specific CSE is displayed to the searching user within the GUI 304. The searching user can enter search terms into the customized search box, which search terms can be provided to the customized search service component 306 for processing through the user-specific CSE. In particular, the search terms can be processed based on the source-specific indices corresponding to the particular user-specific CSE to generate search results. The search results can be displayed to the searching user within the GUI 304. In some examples, data identifying the searching user can be processed by the ACL component 306a to determine the search results that are to be displayed to the user. For example, if the searching user is identified in the ACL associated with a potential search result, the search result is displayed to the user.

Figure 4:
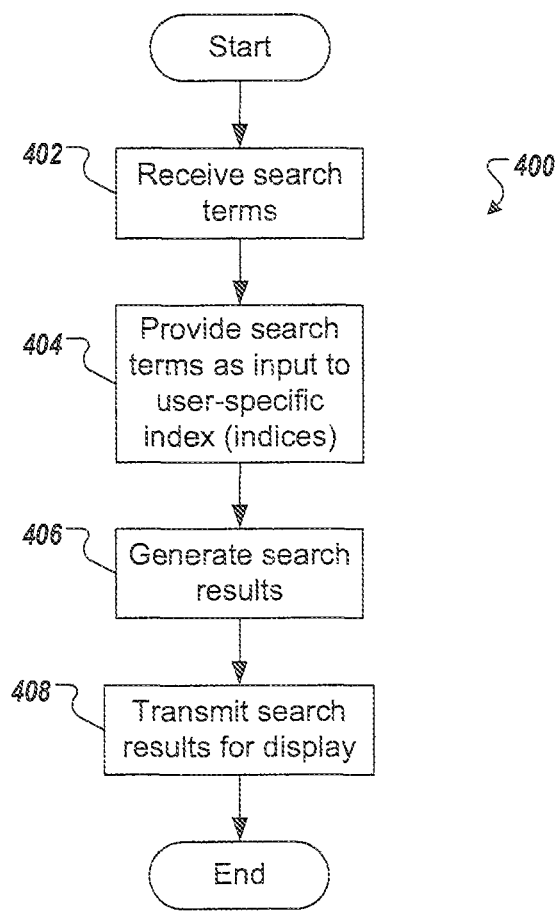
FIG. 4 is a flowchart illustrating an example process for generating search results using a customized search engine.

FIG. 4 is a flowchart illustrating an example process 400 for generating search results using a customized search engine. The example process 400 can be realized using one or more computer program applications that can be executed using one or more processing devices (e.g., computer program application(s) executed by a server system).

One or more search terms are received (402). In some examples, the one or more search terms can be input to a computing device by a searching user and can be transmitted to a search system over a network (e.g., input using a client device and transmitted to a server system). The one or more search terms are provided as input to one or more user-specific indices (404). In some examples, each user-specific index corresponds to a data source of a service provider and to a user of a computer-implemented service provided by the service provider. Search results are generated (406). The search results are transmitted for display to a searching user (408).

Figure 5:
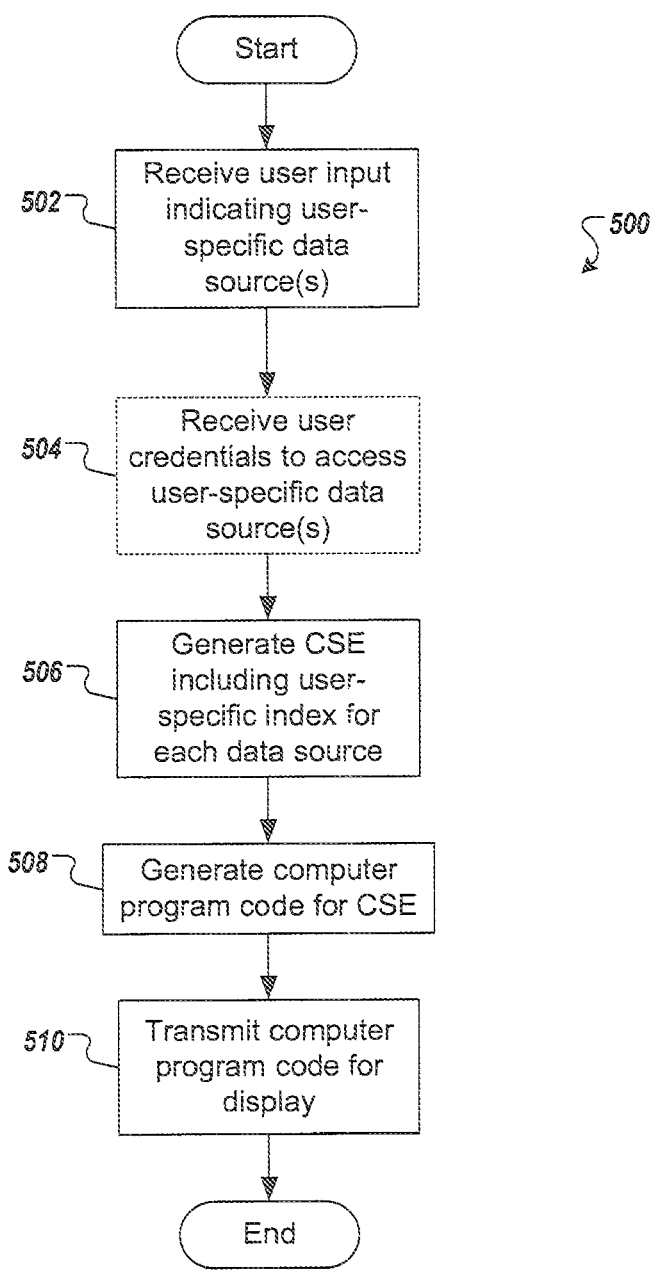
FIG. 5 is a flowchart illustrating an example process for generating a customized search engine.

FIG. 5 is a flowchart illustrating an example process 500 for generating a customized search engine. The example process 500 can be realized using one or more computer program applications that can be executed using one or more processing devices (e.g., computer program application(s) executed by a server system).

User input indicating one or more user-specific data sources is received (502). In some examples, a user can provide user input to a CSE wizard, the user input identifying one or more data sources, as discussed above with reference to FIG. 2A. In some examples, a user can provide user input that includes computer program code, the computer program code identifying one or more data sources. In some examples, user credentials to access one or more of the one or more data sources are received (504). Receipt of user credentials can be optional (e.g., executed in cases where user credentials may be required to access data stored in a data source). A user-specific CSE is generated and includes a user-specific index corresponding to each data source of the one or more data sources (506). Computer program code corresponding to the user-specific CSE is generated (508). The computer program code is transmitted for display to the user (510).

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A non-transitory computer storage medium encoded with a computer program, the program comprising instructions that when executed by one or more computers cause the one or more computers to perform operations comprising:

receiving, from each of a plurality of customizing users, respective input identifying one or more data sources to be searchable through a respective plurality of customized search engines (CSEs) that are specific to the respective customizing user, the input provided through a user interface (UI) presented by at least one first computer of the one or more computers, the one or more data sources storing content that is created by the customizing user through one or more computer-implemented services and for which the customizing user has specified a particular audience that is permitted to access the content through the one or more computer-implemented services;

generating one or more respective search indices for each customizing user in response to an activation of a control of the UI by the customizing user, each of the one or more respective search indices being an index of user-specific data provided through a respective data source of the one or more data sources, the user-specific data comprising at least a portion of the content created by the respective customizing user through the one or more computer-implemented services;

generating, for each of the plurality of CSEs, computer program code comprising instructions that, when executed, cause a customized search box that is specific to the CSE to be displayed; and transmitting the respective computer program code for each of the plurality of CSEs to the respective customizing user, the respective computer code being configured to be incorporated into at least one web document to display a search box for the respective CSE when a web document incorporating the respective computer code is displayed, wherein the respective computer program code executes to:

receive one or more search terms input by a searching user through the customized search box displayed by the at least one web document on a second computer and, in response, determine search results based on the one or more search terms and the one or more search indices, the search results identifying content from the one or more data sources identified by the respective customizing user, wherein at least one of the search results is an access-controlled search result associated with an access control list (ACL) that identifies users corresponding to the particular audience specified by the customizing user as permitted to access the content associated with the access-controlled search result;

present, in the search results, the access-controlled search result, based on the searching user being identified in the ACL; and present, in the search results, a generic representation of the access-controlled search result, based on the searching user not being identified in the ACL, the generic representation including an access request link to request that the customizing user grant access to the access-controlled search result.

2. The medium of claim 1, wherein the operations further comprise receiving authentication data for at least one of the one or more data sources, the authentication data including login credentials associated with a user account of the customizing user, the user account provided by one of the one or more computer-implemented services.

3. The medium of claim 1, wherein the operations further comprise assigning a unique identifier to each of the CSEs.

4. The medium of claim 1, wherein the operations further comprise:

receiving the one or more search terms in a query in a general search box from the searching user;

determining that the searching user has been granted access to one or more of the plurality of CSEs but not to all of the plurality of CSEs; and providing in response to the query general search results and search results from the one or more CSEs to which the searching user has been granted access and not providing search results from the one or more CSEs to which the searching user has not been granted access.

5. The medium of claim 1, wherein:

the UI is a first UI of a CSE wizard that is presented by the at least one of the one or more computers;

the control is a first control included in the first UI of the CSE wizard;

activation of the first control causes the CSE wizard to present a second UI;

the operations further comprise presenting, through the second UI of the CSE wizard, a test search interface to test the respective CSE, wherein the test search interface receives one or more test search terms and initiates a search of the user specific data that employs the one or more respective search indices of the respective CSE, and presents test search results generated through the search of the user specific data;

the generating of the respective CSE computer program code is performed in response to activation of a second control included in the second UI of the CSE wizard;

activation of the second control also causes the CSE wizard to present a third UI; and the respective CSE computer program code is presented in the third UI of the CSE wizard.

6. The medium of claim 1, wherein the one or more data sources are maintained by one or more service providers of the one or more computer-implemented services, the one or more computer-implemented services comprising one or more of an email service, an e-commerce service, a social networking service and a blog hosting service.

7. A computer-implemented method performed by one or more computers, the method comprising:

receiving, from each of a plurality of customizing users, respective input identifying one or more data sources to be searchable through a respective plurality of customized search engines (CSEs) that are specific to the respective customizing user, the input provided through a user interface (UI) presented by at least one first computer of the one or more computers, the one or more data sources storing content that is created by the customizing user through one or more computer-implemented services and for which the customizing user has specified a particular audience that is permitted to access the content through the one or more computer-implemented services;

generating one or more respective search indices for each customizing user in response to an activation of a control of the UI by the customizing user, each of the one or more respective search indices being an index of user-specific data provided through a respective data source of the one or more data sources, the user-specific data comprising at least a portion of the content created by the respective customizing user through the one or more computer-implemented services;

generating, for each of the plurality of CSEs, computer program code comprising instructions that, when executed, cause a customized search box that is specific to the CSE to be displayed; and transmitting the respective computer program code for each of the plurality of CSEs to the respective customizing user, the respective computer code being configured to be incorporated into at least one web document, by the customizing user, to display a search box for the respective CSE when a web document incorporating the respective computer code is displayed, wherein the respective computer program code executes to:
receive one or more search terms input by a searching user through the customized search box displayed by the at least one web document on a second computer and, in response, determine search results based on the one or more search terms and the one or more search indices, the search results identifying content from the one or more data sources identified by the respective customizing user, wherein at least one of the search results is an access-controlled search result associated with an access control list (ACL) that identifies users corresponding to the particular audience specified by the customizing user as permitted to access the content associated with the access-controlled search result;
present, in the search results, the access-controlled search result, based on the searching user being identified in the ACL; and
present, in the search results, a generic representation of the access-controlled search result, based on the searching user not being identified in the ACL, the generic representation including an access request link to request that the customizing user grant access to the access-controlled search result.

8. The method of claim 7, further comprising receiving authentication data for at least one of the one or more data sources, the authentication data including login credentials associated with a user account of the customizing user, the user account provided by one of the one or more computer-implemented services.

9. The method of claim 7, further comprising assigning a unique identifier to each of the CSEs.

10. The method of claim 7, further comprising:
receiving the one or more search terms in a query in a general search box from the searching user;
determining that the searching user has been granted access to one or more of the plurality of CSEs but not to all of the plurality of CSEs; and
providing in response to the query general search results and search results from the one or more CSEs to which the searching user has been granted access and not providing search results from the one or more CSEs to which the searching user has not been granted access.

11. The method of claim 7, wherein the one or more data sources are maintained by one or more service providers of the one or more computer-implemented services, the one or more computer-implemented services comprising one or more of an email service, an e-commerce service, a social networking service and a blog hosting service.

12. A system comprising:
a computing device; and
a computer-readable medium coupled to the computing device and having instructions stored thereon which, when executed by the computing device, cause the computing device to perform operations comprising:
receiving, from each of a plurality of customizing users, respective input identifying one or more data sources to be searchable through a respective plurality of customized search engines (CSEs) that are specific to the respective customizing user, the input provided through a user interface (UI) presented by the computing device, the one or more data sources storing content that is created by the customizing user through one or more computer-implemented services and for which the customizing user has specified a particular audience that is permitted to access the content through the one or more computer-implemented services;
generating one or more respective search indices for each customizing user in response to an activation of a control of the UI by the customizing user, each of the one or more respective search indices being an index of user-specific data provided through a respective data source of the one or more data sources, the user-specific data comprising at least a portion of the content created by the respective customizing user through the one or more computer-implemented services;
generating, for each of the plurality of CSEs, computer program code comprising instructions that, when executed, cause a customized search box that is specific to the CSE to be displayed; and
transmitting the respective computer program code for each of the plurality of CSEs to the respective customizing user, the respective computer code being configured to be incorporated into at least one web document, by the customizing user, to display a search box for the respective CSE when a web document incorporating the respective computer code is displayed, wherein the respective computer program code executes to:
receive one or more search terms input by a searching user through the customized search box displayed by the at least one web document on a second computer and, in response, determine search results based on the one or more search terms and the one or more search indices, the search results identifying content from the one or more data sources identified by the respective customizing user, wherein at least one of the search results is an access-controlled search result associated with an access control list (ACL) that identifies users corresponding to the particular audience specified by the customizing user as permitted to access the content associated with the access-controlled search result;
present, in the search results, the access-controlled search result, based on the searching user being identified in the ACL; and
present, in the search results, a generic representation of the access-controlled search result, based on the searching user not being identified in the ACL, the generic representation including an access request link to request that the customizing user grant access to the access-controlled search result.

13. The system of claim 12, wherein the operations further comprise receiving authentication data for at least one of the one or more data sources, the authentication data including login credentials associated with a user account of the customizing user, the user account provided by one of the one or more computer-implemented services.

14. The system of claim 12, wherein the operations further comprise assigning a unique identifier to each of the CSEs.

15. The system of claim 12, wherein the operations further comprise:
receiving the one or more search terms in a query in a general search box from the searching user;
determining that the searching user has been granted access to one or more of the plurality of CSEs but not to all of the plurality of CSEs; and providing in response to the query general search results and search results from the one or more CSEs to which the searching user has been granted access and not providing search results from the one or more CSEs to which the searching user has not been granted access.

16. The system of claim 12, wherein the one or more data sources are maintained by one or more service providers of the one or more computer-implemented services, the one or more computer-implemented services comprising one or more of an email service, an e-commerce service, a social networking service and a blog hosting service.

\* \* \* \* \*